US009479815B2

(12) United States Patent  
Gupta et al.

(10) Patent No.: US 9,479,815 B2  
(45) Date of Patent: *Oct. 25, 2016

(54) SYSTEM, METHOD, AND APPARATUS FOR PROVIDING DIGITAL VIDEO RECORDER SERVICES ON A PORTABLE WIRELESS DEVICE

(71) Applicant: CenturyLink Intellectual Property LLC, Denver, CO (US)

(72) Inventors: Shekhar Gupta, Lower Gwynedd, PA (US); Mike A. Roberts, Overland Park, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 4 days.

This patent is subject to a terminal disclaimer.

(21) Appl. No.: 14/291,964

(22) Filed: May 30, 2014

(65) Prior Publication Data

US 2014/0259068 A1 Sep. 11, 2014

Related U.S. Application Data

(63) Continuation of application No. 12/178,462, filed on Jul. 23, 2008, now Pat. No. 8,782,731.

(51) Int. Cl.  
*H04N 7/16* (2011.01)  
*H04N 7/18* (2006.01)  
(Continued)

(52) U.S. Cl.  
CPC ............ *H04N 21/4147* (2013.01); *H04N 5/76* (2013.01); *H04N 9/79* (2013.01); *H04N 9/87* (2013.01); *H04N 21/4126* (2013.01); *H04N 21/41407* (2013.01); *H04N 21/4325* (2013.01); *H04N 21/4334* (2013.01); *H04N 21/4532* (2013.01); *H04N 21/4622* (2013.01);

(Continued)

(58) Field of Classification Search  
USPC .......... 725/62, 74, 78, 80–82, 133, 141, 153  
See application file for complete search history.

(56) References Cited

U.S. PATENT DOCUMENTS

| 8,782,731 B2* | 7/2014 | Gupta et al. .................. 725/133 |
| 2004/0158855 A1* | 8/2004 | Gu et al. .......................... 725/39 |

(Continued)

OTHER PUBLICATIONS

Action Engine, "The Action Engine Electronic Programming Guide (EPG) Solution", Mar. 2007, Bellevue, Washington, USA, located at: http://www.actionengine.com/docs/datasheets/EPG.pdf; 2 pages.

(Continued)

*Primary Examiner* — Nasser Goodarzi  
*Assistant Examiner* — Fred Peng  
(74) *Attorney, Agent, or Firm* — Swanson & Bratschun, L.L.C.

(57) ABSTRACT

Methods and apparatus for providing digital video recorder services with a portable wireless device (PWD). The PWD includes at least a transceiver, a processing unit and a memory unit. The transceiver receives a video content signal transmitted from a broadcaster of mobile broadcast digital TV, and an electronic program guide (EPG). The processing unit is in communication with the transceiver and the memory unit and the processing unit: stores the TV programming information on the memory unit; displays, responsive to a first user input, the TV programming information; records on the memory unit, responsive to a second user input, a selected video content signal received by the transceiver; and plays back the selected video content signal, responsive to a third user input, from the memory unit.

16 Claims, 3 Drawing Sheets

(51) Int. Cl.

| | |
|---|---|
| *H04N 7/20* | (2006.01) |
| *H04N 7/173* | (2011.01) |
| *H04N 21/4147* | (2011.01) |
| *H04N 5/76* | (2006.01) |
| *H04N 21/41* | (2011.01) |
| *H04N 21/414* | (2011.01) |
| *H04N 21/432* | (2011.01) |
| *H04N 21/433* | (2011.01) |
| *H04N 21/462* | (2011.01) |
| *H04N 21/472* | (2011.01) |
| *H04N 21/482* | (2011.01) |
| *H04N 9/79* | (2006.01) |
| *H04N 9/87* | (2006.01) |
| *H04N 21/45* | (2011.01) |
| *H04N 5/782* | (2006.01) |

(52) U.S. Cl.
CPC ..... *H04N 21/47214* (2013.01); *H04N 21/482* (2013.01); *H04N 21/4821* (2013.01); *H04N 5/782* (2013.01)

(56) References Cited

U.S. PATENT DOCUMENTS

| | | | |
|---|---|---|---|
| 2006/0101498 A1* | 5/2006 | Arling et al. .................... 725/81 | |
| 2006/0155850 A1 | 7/2006 | Ma et al. | |
| 2006/0184975 A1 | 8/2006 | Casey | |
| 2006/0253874 A1 | 11/2006 | Stark et al. | |
| 2006/0271953 A1* | 11/2006 | Jacoby ................ H04N 7/173 725/34 | |
| 2007/0130592 A1* | 6/2007 | Haeusel ........................... 725/81 | |
| 2007/0154163 A1* | 7/2007 | Cordray ............ H04N 21/6187 386/278 | |
| 2008/0066111 A1* | 3/2008 | Ellis et al. ....................... 725/57 | |
| 2008/0072261 A1 | 3/2008 | Ralston et al. | |
| 2008/0092198 A1* | 4/2008 | Hutten ............... H04N 5/44543 725/133 | |
| 2009/0320077 A1 | 12/2009 | Gazdzinski | |
| 2010/0023975 A1 | 1/2010 | Gupta et al. | |
| 2012/0159546 A1* | 6/2012 | Klein et al. ...................... 725/40 | |

OTHER PUBLICATIONS

Broadcast Engineering, "GIST launches mobile TV EPG", Overland Park, Kansas, USA, Oct. 6, 2005, located at http://broadcastengineering.com/products/Gist-tv-epg-20051006/: 1 page.

Jana, R. et al., "Clicker—An IPTV Remote Control in Your Cell Phone", abstract published online by IEEE Xplore, located at http://ieeexplore.ieee.org/Xplore/login.jsp?url=/iel5/4284552/4284553/04284835.pdf; 1 page. This paper appears in: Multimedia and Expo, 2007 (IEEE International Conference on), Jul. 2-5, 2007 on pp. 1055-1058.

SERGSJP, "Free mobile epg app. in china", Nokia MOSH Website, White Plains, NY, USA, Jan. 7, 2008, located at: http://mosh.nokia.com/content/431D062A9090335Fe040050A4530498F; 2 pages.

U.S. Appl. No. 12/178,462; Final Rejection dated May 13, 2011; 13 pages.

U.S. Appl. No. 12/178,462; Final Rejection dated Jul. 12, 2013; 15 pages.

U.S. Appl. No. 12/178,462; Issue Notification dated Jun. 25, 2014; 1 page.

U.S. Appl. No. 12/178,462; Non-Final Rejection dated Nov. 30, 2010; 15 pages.

U.S. Appl. No. 12/178,462; Non-Final Rejection dated Nov. 9, 2012; 14 pages.

U.S. Appl. No. 12/178,462; Notice of Allowance dated Mar. 4, 2014; 19 pages.

\* cited by examiner

SYSTEM, METHOD, AND APPARATUS FOR PROVIDING DIGITAL VIDEO RECORDER SERVICES ON A PORTABLE WIRELESS DEVICE

CROSS REFERENCE TO RELATED APPLICATION

This application is a continuation of U.S. patent application Ser. No. 12/178,462, filed Jul. 23, 2008 by Shekhar Gupta et al. and entitled, "System, Method, and Apparatus for Providing Digital Video Recorder Services on a Portable Wireless Device", which is hereby incorporated by reference in its entirety.

FIELD OF THE INVENTION

The field of the invention relates in general to cellular telephone services and, in particular, to providing digital video recording capability to a cellular telephone or similar portable device.

BACKGROUND OF THE INVENTION

Emerging standards for providing mobile broadcast digital television services compatible with portable wireless devices such as cell phones and personal digital assistants include Digital Video Broadcast-Handheld (DVB-H), Integrated Services Digital Broadcast-Terrestrial (ISDB-T), Digital Multimedia Broadcast (DMB), and Forward Link Only (FLO). As content becomes more widely available via one or more of these standards, and compatible portable wireless devices proliferate, the ways in which individual consumers interact with their portable wireless devices and access digital TV (DTV) will change. It is expected that consumers will look for increased compatibility and convergence between the way they access DTV at home and the ways they access DTV when using a portable wireless device.

A large market exists for digital video recorders (DVR's) that enable a user to conveniently "time shift" video content. The "time shift" is enabled by recording content transmitted by a content provider so that it may be replayed at a time more convenient to the user. The broadcast schedules and related information ("TV programming information") of various broadcasters are aggregated by providers of TV programming information, such as TV Guide, and made accessible to the user via the user's television and/or DVR as well as over the Internet and by conventional printed means. Armed with such TV programming information, a user is enabled to program the user's DVR to record broadcasts days or weeks ahead of the scheduled broadcast. As is well known in the art, a DVR is commonly configured as a set-top box and associated with a user's home installation which may include, for example, a television, cable/satellite interface box, and DVD player and/or VCR.

While DVRs provide consumers with the ability to time shift broadcast video content for home viewing, this capability is insufficient for content having reduced value to the consumer if not available for viewing near the time that the program or event occurs. As illustrated by the following examples, there are a variety of scenarios that would delay someone's ability to timely watch a program or event that loses value if not timely watched.

Scenario 1. "Road Warrior". A considerable fraction of broadcast TV loses entertainment value when "suspense" is gone. For many viewers, it is not satisfactory to watch, e.g., a televised sports event or a reality TV show, the next day (when the outcome will inevitably be widely published and discussed). Traveling businesspeople, those who work late, and those who fly during programming and event broadcast times are examples of people who lose the ability to view programming and events that have suspense value when timely watched.

Scenario 2. "Commuters". For many urban commuter passengers, televised content of for example, sporting events, political debates and newscasts, occur partially during commute times. A passenger on a 5:15 train wishing to watch a political debate or sports event that starts at 5:00 pm may feel less interested if he or she missed the opening minutes of play, or other preceding moments of the broadcast.

Scenario 3. "Vacationers". Family members traveling on vacation may still wish to stay current with their favorite television shows. For them, a problem arises because these shows may be broadcast during times devoted to travel and sightseeing.

SUMMARY

To enable consumers of television to timely view programming and events on a portable device, the principles of the present invention provide for DVR capabilities for a portable wireless device (PWD), such as a mobile telephone. By having DVR capabilities on a PWD, users may timely watch a program or event so as to view the program or event while there is more value or suspense. Having DVR capabilities in a PWD may also enable a user to be more productive as he or she may watch the events at times that better accommodate his or her schedule (e.g., when commuting or traveling).

In accordance with one embodiment of the invention, PWD for providing digital video recorder services has a transceiver, a memory unit and a processing unit. The transceiver receives a video content signal transmitted from a broadcaster of mobile broadcast digital TV, and an electronic program guide (EPG), where the EPG is a first data set of TV programming information. The processing unit is in communication with the memory unit and the transceiver, and stores the first data set of TV programming information on the memory unit. Responsive to a first user input, the processing unit: displays at least a portion of the first data set of TV programming information; responsive to a second user input; records on the memory unit a selected video content signal received by the wireless receiver; and, responsive to a third user input, plays back the selected video content signal from the memory unit.

In an embodiment, the second input by the user is programming the processing unit whereby the transceiver receives the selected video content signal on a selected channel at a selected time.

In an embodiment, the processing unit records user viewing preferences on the memory unit and, in a further embodiment, displays tailored command menus to the user based on the recorded user viewing preferences In an embodiment, the processing unit obtains a second data set of TV programming information by synchronizing with a digital video recorder configured as a set-top box and, in a further embodiment, the processing unit receives the second user input by receiving a recording schedule from the set-top box.

In an embodiment, the processing unit obtains a second data set of TV programming information by synchronizing with a digital video recorder configured as a set-top box and compares the first data set with the second data set, and, responsive to a further user input, displays an indication of a difference between the first data set and the second data set. In a further embodiment the difference is related to a physical locality of the mobile device in which case, a local time and/or a program schedule for mobile broadcast digital TV at that physical locality may be different than at the digital video recorder.

BRIEF DESCRIPTION OF THE DRAWINGS

Illustrative embodiments of the principles of the present invention are described in detail below with reference to the attached drawing figures, which are incorporated by reference herein and wherein.

DETAILED DESCRIPTION OF THE DRAWINGS

A detailed description of preferred embodiments of the present invention is provided hereinbelow. It is to be understood, however, that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
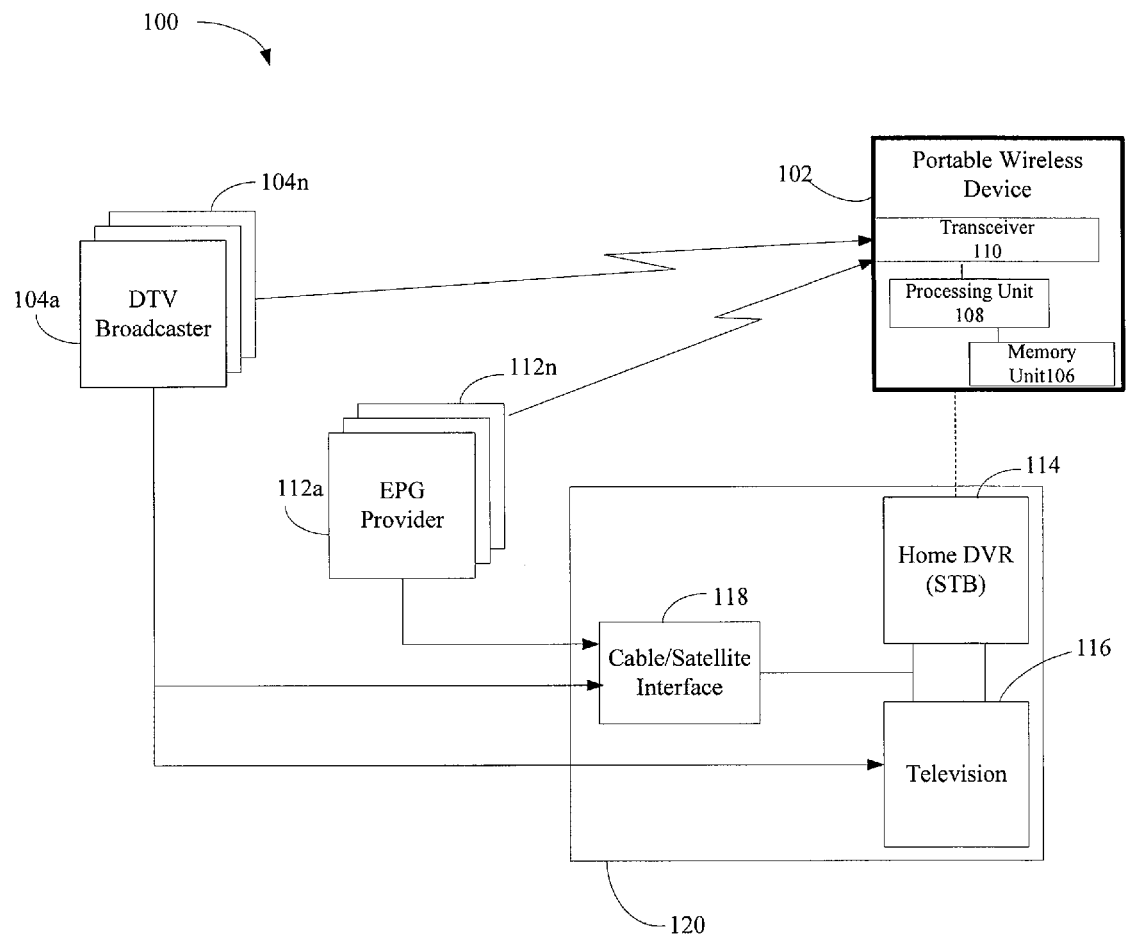
FIG. 1 is a block diagram of an illustrative system implementation in accordance with the principles of the present invention.

FIG. 1 illustrates a block diagram of an exemplary system embodiment 100 in accordance with the principles of the present invention, whereby a digital video recorder (DVR) capability is provided on a portable wireless device (PWD) 102. As the term is used herein, a portable wireless device means an electronic device configured for mobile operation on a network. The portable wireless device may be configured to operate on a cellular telephone network, Internet, satellite, or any other local or wide area network. The portable wireless device may be a cell phone, personal digital assistant, portable MP-3 player, palmtop computer, or personal game console, for example.

The portable wireless device 102 may be adapted to receive a video content signal, such as a mobile broadcast DTV signal transmitted from one or more DTV broadcasters 104a-104n (collectively 104). The mobile broadcast DTV may be compliant with one or more standards, such as DVB-H, ISDB-T, DMB, and FLO. Alternative standards may be utilized as well. The portable wireless device 102 has a memory unit 106. Conveniently, the memory unit 106 may include a removable flash memory device, such as a USB flash drive, or any other memory technology as understood in the art.

PWD 102 may further include a processing unit 108 and transceiver 110. Furthermore, PWD 102 may include a user interface (not shown), such as a display (e.g., touch screen display), and keyboard, as are well known in the art. By such user interface, a user is enabled to enter commands and receive information.

In operation, PWD 102 may provide the capability to display and play back a video content signal to the user. The video content signal may be live TV, video on-demand, or any other video content signal available from one of the DTV broadcasters 104. The video content signal received from the content provider may be stored in the memory unit 106 and played back from the memory unit 106. PWD 102 is operable to selectably receive a mobile broadcast DTV signal transmitted from at least one of the DTV broadcasters 104. PWD 102 is further operable to receive electronic program guide (EPG) information from at least one of a number of EPG providers 112a-112n (collectively 112). As understood in the art, an EPG provides programming information of video content available on each available channel.

In response to a user's input, PWD 102 is operable to a display video content signal (e.g., mobile broadcast DTV) and/or EPG information. Moreover, PWD 102 is programmable, such that a user may program PWD 102 to record a selected video content signal scheduled to be broadcast at a later time. The user may use displayed EPG information as an aid in programming PWD 102. For example, the EPG information ordinarily includes broadcast schedules for various DTV broadcasters, from which the user may choose the selected video content signal the user wishes to record.

A selected video content signal may be recorded in memory unit 106, for later play back. A user may play back the selected video content signal on PWD 102 or may transfer the selected video content signal to a second video player or device, such as a laptop computer, or set-top digital video recorder. This transference may be accomplished by physically moving the memory unit 106, if removable, from PWD 102 to the second device, or via a wired or wireless connection with the second device.

In an embodiment, PWD 102 may record user viewing preferences on the memory unit. For example, a list of programs that a user prefers may be recorded, or a classification of a type of programming (e.g. broadcasts of games by the user's favorite sports teams) may be recorded. Furthermore, PWD 102 may provide individually tailored command menus based on the recorded user preferences, including, for example "alerts" when a broadcast matching a user's preference becomes available.

In one embodiment, PWD 102 is interoperable with a home DVR 114. For example, a recording schedule programmed onto DVR 114 by a user may be downloaded to PWD 102. Alternatively, a recording schedule programmed onto PWD 102 by a user may be uploaded to DVR 114. Such uploading and/or downloading may be accomplished by any conventional means, e.g., by a wired or wireless connection or by swapping memory unit 106. As is known in the art, DVR 114 may be configured as a set-top box (SIB) associated with a television 116. A cable/satellite interface box 118 may provide the video content input to the DVR 114 and television 116. Collectively, DVR 114, television 116, and cable/satellite interface box 118 are referred to as a home installation 120.

Home installation 120 receives video content signals and EPG information from, respectively, a first subset of the DTV broadcasters 104 and a first subset of the EPG providers 112. Ordinarily, changes to these subsets occur infrequently, as a result, for example, of pre-announced changes in a cable TV providers' channel line-up or from a user's election to change the subset of broadcasters to which the user subscribes. Moreover, cable/satellite interface box 118 ordinarily provides interfaces between the DVR 114 and, respectively, available subsets of the DTV broadcasters 104 and EPG providers 112.

In accordance with an embodiment of the present invention, PWD 102 may directly receive a selected mobile broadcast DTV signal from at least one of the DTV broadcasters 104 and to directly receive TV programming information from at least one of the EPG providers 112. Moreover, PWD 102 may be operable to receive TV programming information by a radio link from one of the EPG providers 112.

In general, PWD 102 may be operable with a second subset of the DTV broadcasters 104 and a second subset of the EPG providers 112 substantially different from the first subsets from which the home installation 120 receives video content signals and EPG information. For example, PWD 102 may receive video content formatted in accordance with mobile broadcast DTV standards suitable for a portable device (e.g., DVB-H, ISDB-T, DMB, and FLO) rather than a standard suitable for home television viewing. Content available from DTV broadcasters 104 providing mobile broadcast DTV signals formatted for a portable device are not necessarily available at the same time as content broadcast for viewing on a conventional television. Moreover, the user may take the portable device to a time zone and/or geographic region different from the location of the home installation 120.

In accordance with an embodiment of the present invention, PWD 102 may be adapted to accommodate for the above described differences. For example, in one embodiment, PWD 102 may obtain current programming information (a first data set) via a radio link or otherwise from one or more of the EPG providers 112. PWD 102 may also be configured to obtain programming information and the user's desired recording schedule (together, a second data set) by synchronizing PWD 102 with DVR 114. In this embodiment, PWD 102 may compare the first data set and the second data set, and display for the user an indication of a difference between the first data set and the second data set. The user may use the displayed indication to adjust the user's desired recording schedule.

As an example, assume a user's desired recording schedule includes Program A, Program B, and Program C. These programs may normally be distributed by the user's home cable/satellite provider once per week at a fixed time. PWD 102, after being synchronized with DVR 114, retains a record of the user's desired recording schedule (i.e. Programs A, B, and C) as well as associated programming information for Programs A, B, and C (i.e., the broadcast dates and times and an identification of the television network or other content provider). Collectively, these retained records are referred to as the second data set. Subsequent to synchronizing PWD 102 with DVR 114, when the user leaves home with PWD 102 (travels to a new location) PWD 102 is able to obtain local programming information (the first data set) via a radio link or otherwise from one or more of the EPG providers 112. The first data set may include the schedule according to which Programs A, B, and C are available for viewing or recording by PWD 102 at the new location. For example, at the new location, one or more of Programs A, B, and C may not be broadcast in a mobile broadcast DTV format compatible with PWD 102 or may be broadcast at a different time of day. By comparing the first data set and the second data set and displaying an indication of the differences between the first data set and the second data set, PWD 102 enables the user to easily adjust the user's desired recording schedule.

Figure 2:
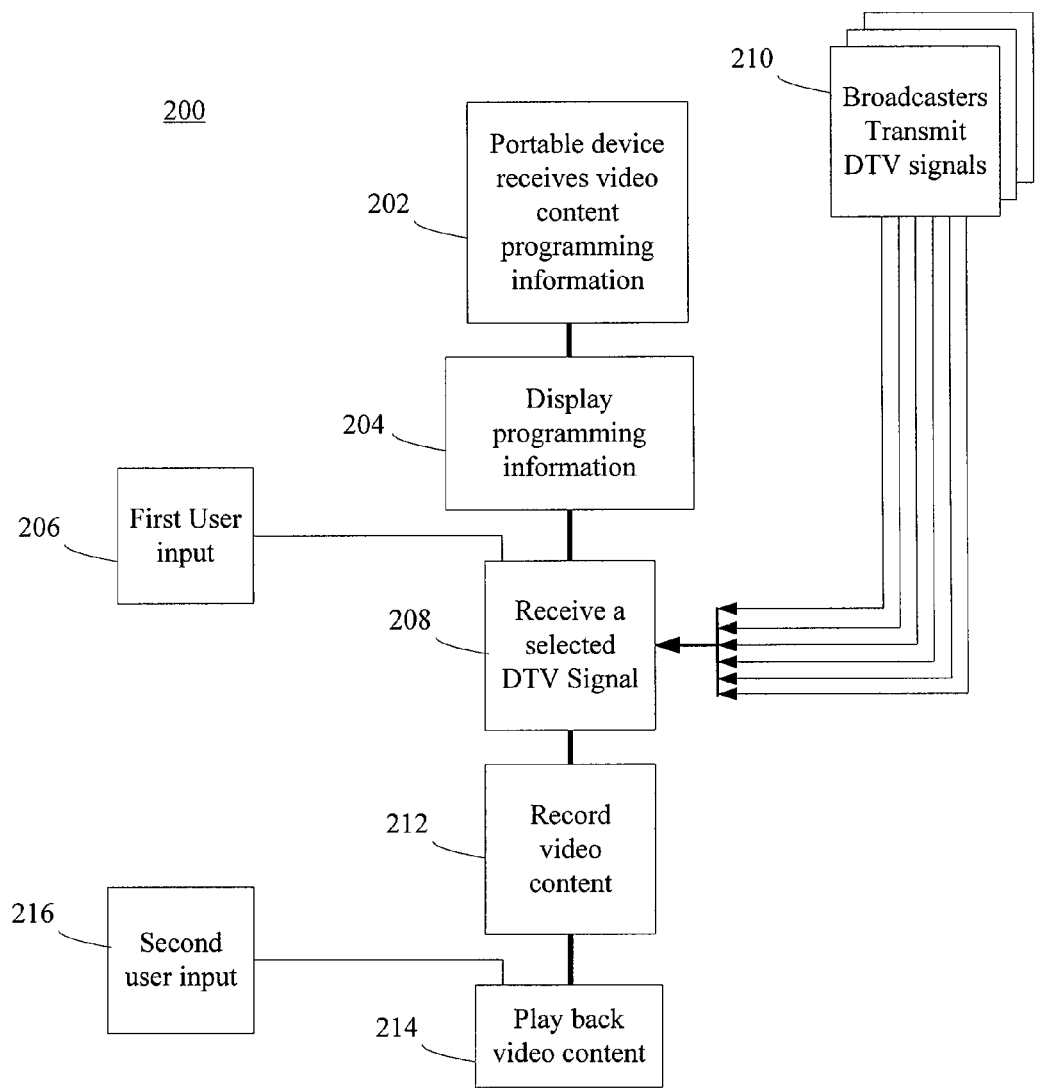
FIG. 2 is a flowchart of an illustrative process for implementing DVR capability on a portable wireless device in accordance with an illustrative embodiment.

Referring now to FIG. 2, an example process 200 of the present invention is shown. At step 202, a PWD receives a first data set of TV programming information (for example, an EPG). The first data set of video programming information may be received from an EPG provider, or, for example, a user's home DVR. In response to a first user input 203, the PWD displays, at step 204, at least a portion of the first data set. In response to a second user input 206, the PWD, at step 208, receives a selected video content signal from a plurality of signals transmitted at step 210 by one or more mobile broadcast DTV broadcasters. The received video content signal is recorded at step 212. At step 214, in response to a third user input 216, the selected video content signal may be played back.

Figure 3:
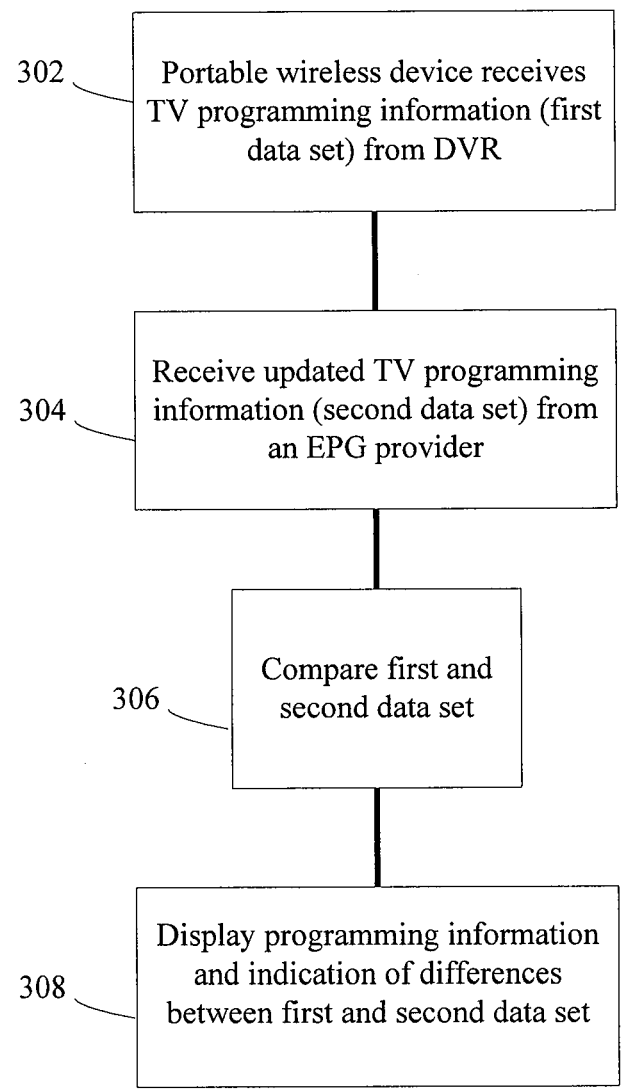
FIG. 3 is a flowchart of an illustrative process for implementing DVR capability on a portable wireless device.

As indicated above, at step 202, the PWD may receive video content programming information from a user's home DVR. In such case, as illustrated in FIG. 3, an embodiment of the invention provides for additional steps. After the PWD receives, at step 302, TV programming information (the first data set) from the user's home DVR, the portable device may receive, at step 304, current TV programming information (the second data set) from an EPG provider.

For a number of reasons, the first data set and the second data set may not be identical. For example, much programming that is broadcast via cable or satellite for home viewing may not be available in formats compatible with a portable device. Moreover, the PWD may have been transported to a location far removed from a user's home installation. As a result, the PWD may be in a different time zone than the home installation, and/or broadcasters in the locality of the portable device may have a different program schedule than those near the home installation. To mitigate this problem, the PWD may compare the first and second data set at step 306. Results of the comparison, along with programming information, may be displayed at step 308. The comparison, for example, may include an indication of a difference between the first and second data sets, such as a difference in program broadcast time. Based on the results of the comparison, the user may easily adjust the user's desired recording schedule.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described. For example, rather than content being stored by the PWD 102 of FIG. 1, a network node may store the content and the PWD 102 may access the stored content using a user interface to view title, date and time information, and description of available content to be viewed from the network mode.

Although the foregoing detailed description has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims; all matter contained in the above description and shown in the accompanying drawings shall be interpreted as illustrative and not in a limiting sense.

What is claimed is:

1. A portable wireless device (PWD) for providing digital video recorder services, the PWD comprising:
a non-transitory memory unit; and
a processing unit in communication with the memory unit and transceiver, wherein the processing unit executes instructions to:
receive an electronic program guide (EPG); the EPG comprising a first data set of TV programming information;
store the first data set of TV programming information on the memory unit;
responsive to a first user input, display at least a portion of the first data set;
responsive to a second user input, record on the memory unit selected video content;
responsive to a third user input, play back the selected video content from the memory unit;
receive a recording schedule from a set-top box, the recording schedule indicating a program to be recorded;
receive a second data set of TV programming information, wherein the second set of TV programming information indicates that the program to be recorded according to the received recording schedule is not available to the PWD as scheduled;
compare the first data set with the second data set;
display an indication of a difference between the first data set and the second data set, the indication of the difference including at least some of the TV programming information, wherein the difference is related to a physical locality of the PWD, wherein a program schedule for mobile broadcast digital TV at the physical locality of the PWD is different from a program schedule at the set-top box;
adjust the recording schedule based on a fourth user input received after displaying the difference; and
record additional video content on the memory unit in accordance with the adjusted recording schedule.

2. The PWD of claim 1, wherein the second user input comprises input to programming the processing unit to receive the selected video content signal on a selected channel at a selected time.

3. The PWD of claim 1, wherein the processing unit is further configured to record user viewing preferences on the memory unit.

4. The PWD of claim 3, wherein the processing unit is further configured to display tailored command menus to the user based on the recorded user viewing preferences.

5. The PWD of claim 1, wherein the processing unit is further configured to obtain the second data set of TV programming information by synchronizing with the set-top box.

6. The PWD of claim 1, wherein the difference is related to a local time at the physical locality of the PWD being different from a local time at the set-top box.

7. The PWD of claim 1, further comprising a transceiver for receiving a video content signal comprising the video content, the video content signal being transmitted from a broadcaster of mobile broadcast digital TV.

8. A method for providing digital video recorder services, the method comprising:
receiving an electronic program guide (EPG) at a portable wireless device (PWD), the EPG comprising a first data set of TV programming information;
storing the TV programming information on the PWD;
in response to a first user input, displaying the TV programming information on the PWD;
in response to a second user input, recording selected video content on a memory unit of the PWD;
in response to a third user input, playing back the selected video content signal on the PWD;
receiving a recording schedule from a set-top box, the recording schedule indicating a program to be recorded;
receiving a second data set of TV programming information, wherein the second set of TV programming information indicates that the program to be recorded according to the received recording schedule is not available to the PWD as scheduled;
comparing the first data set with the second data set;
displaying an indication of a difference between the first data set and the second data set, the indication of the difference including at least some of the TV programming information, wherein the difference is related to a physical locality of the PWD, wherein a program schedule for mobile broadcast digital TV at the physical locality of the PWD is different from a program schedule at the set-top box;
adjusting the recording schedule based on a fourth user input received after displaying the difference; and
recording additional video content on the memory unit, in accordance with the adjusted recording schedule.

9. The method of claim 8, further comprising receiving the selected video content signal on a selected channel at a selected time by the PWD.

10. The method of claim 8, further comprising recording user viewing preferences.

11. The method of claim 10, further comprising displaying tailored command menus to the user based on the recorded user viewing preferences.

12. The method of claim 8, further comprising receiving the second data set of TV programming information by synchronizing with the set-top box.

13. The method of claim 8, wherein the difference is related to a local time at the physical locality of the PWD being different from a local time at the set-top box.

14. The method of claim 8, wherein the PWD comprises a transceiver, the method further comprising receiving a video content signal comprising the video content, the video content signal being transmitted from a broadcaster of mobile broadcast digital TV.

15. The PWD of claim 1, wherein the difference is related to an incompatibility between the PWD and a format of the program to be recorded according to the recording schedule.

16. The method of claim 8, wherein the difference is related to an incompatibility between the PWD and a format of the program to be recorded according to the recording schedule.

* * * * *